US007876681B2

(12) United States Patent
Pan et al.

(10) Patent No.: US 7,876,681 B2
(45) Date of Patent: Jan. 25, 2011

(54) SYSTEMS AND METHODS FOR CONTROLLING NETWORK-BOUND TRAFFIC

(75) Inventors: Jie Pan, Plano, TX (US); Scott R. Kotrla, Wylie, TX (US); Louis A. McKeague, Garland, TX (US)

(73) Assignee: Verizon Business Global LLC, Ashburn, VA (US)

( * ) Notice: Subject to any disclaimer, the term of this patent is extended or adjusted under 35 U.S.C. 154(b) by 2933 days.

(21) Appl. No.: 10/153,922

(22) Filed: May 24, 2002
(Under 37 CFR 1.47)

(65) Prior Publication Data
US 2003/0218977 A1 Nov. 27, 2003

(51) Int. Cl.
*H04L 12/26* (2006.01)
(52) U.S. Cl. ............................. 370/232; 370/235
(58) Field of Classification Search .............. 370/230, 370/232, 235; 709/244
See application file for complete search history.

(56) References Cited

U.S. PATENT DOCUMENTS

| | | | |
|---|---|---|---|
| 5,884,032 A | 3/1999 | Bateman et al. | |
| 5,928,331 A | 7/1999 | Bushmitch | |
| 6,035,333 A | 3/2000 | Jeffries et al. | |
| 6,115,356 A | 9/2000 | Kalkunte et al. | |
| 6,141,412 A | 10/2000 | Smith et al. | |
| 6,170,022 B1* | 1/2001 | Linville et al. | 710/29 |
| 6,198,722 B1 | 3/2001 | Bunch | |
| 6,473,851 B1 | 10/2002 | Plutowski | |
| 6,535,482 B1 | 3/2003 | Hadi Salim et al. | |
| 6,618,357 B1 | 9/2003 | Geyer et al. | |
| 6,628,613 B1* | 9/2003 | Joung et al. | 370/230 |
| 6,816,903 B1 | 11/2004 | Rakoshitz et al. | |
| 6,859,435 B1 | 2/2005 | Lee et al. | |
| 6,970,424 B2 | 11/2005 | Fawaz et al. | |
| 6,976,089 B2 | 12/2005 | Na et al. | |
| 7,002,911 B1 | 2/2006 | Linville et al. | |
| 7,031,258 B1 | 4/2006 | Frisch et al. | |
| 2001/0037387 A1 | 11/2001 | Gilde et al. | |
| 2002/0035642 A1* | 3/2002 | Clarke et al. | 709/244 |
| 2002/0131365 A1 | 9/2002 | Barker et al. | |
| 2002/0141427 A1* | 10/2002 | McAlpine | 370/413 |
| 2003/0012137 A1* | 1/2003 | Abdelilah et al. | 370/229 |
| 2003/0177215 A1 | 9/2003 | Sutherland et al. | |
| 2003/0185249 A1 | 10/2003 | Davies et al. | |

OTHER PUBLICATIONS

"Part 3: Carrier Sense Multiple Access with Collision Detection (CSMA/CD) Access method and Physical Layer Specifications", IEEE Std 802.3, 2000 Edition, The Institute of Electrical and Electronics Engineers, Inc., New York, Copyright 2000, pp. 1-1515.

* cited by examiner

*Primary Examiner*—Salman Ahmed (57) ABSTRACT

A network device controls the flow of traffic in a network, such as an Ethernet-based network. The network device detects congestion in the network and identifies at least one upstream device to which to send a flow control message, where the upstream device is a device that is transmitting above a predetermined level. The network device then transmits the flow control message to the identified upstream device. The flow control message instructs the identified upstream device to slow down transmissions to the network device.

25 Claims, 10 Drawing Sheets

SYSTEMS AND METHODS FOR CONTROLLING NETWORK-BOUND TRAFFIC

FIELD OF THE INVENTION

The present invention relates generally to communications networks and, more particularly, to systems and methods for controlling the flow of network-bound traffic in an Ethernet-based communications network.

BACKGROUND OF THE INVENTION

Service providers commonly find it valuable to allow bursty traffic from customers into the communications network and, similarly, from the network towards customers. To accommodate these traffic bursts, service providers often set a guaranteed service rate and a maximum burst rate in a service contract (e.g., a Service Level Agreement). The service provider may guarantee a fixed rate for the services provided to the customer, but also allow the customer to transmit or receive information at a higher rate, up to the maximum burst rate, when there are accommodating resources in the network.

Due to the increased volume of traffic associated with these bursts, devices in the network, such as switches, may become congested. Conventional Ethernet networks lack the necessary control mechanisms for handling bursty traffic while still maintaining the intrinsic benefits of the Ethernet networking technology. Many current designs use a buffer to hold excessive traffic when there is congestion or a need for congestion avoidance downstream, and transmit the buffered traffic at the available downstream capacity. Such a design introduces the following drawbacks, however. Since buffer size is limited, packet loss may be experienced in those situations where the excessive traffic causes the buffer to overflow. Such packet loss leads to an unfavorable impact on the service contract. Moreover, buffering introduces delay and delay variation, which may degrade the quality of the services supported.

Another conventional approach to handling bursty traffic involves the use of PAUSE messages, as defined in IEEE Std 802.3, 2000 Edition. In this approach, when a network device detects congestion on an outgoing link, the network device automatically sends a PAUSE message to all upstream devices to which the network device is connected, indicating that the flow of traffic from those upstream devices should temporarily cease. Upon receipt of the PAUSE message at the upstream devices, each device automatically transmits a PAUSE message to each other upstream device to which that device is connected, and so on.

This approach also has some drawbacks. For instance, assume that a customer's network devices are operating at or below the guaranteed service rate defined in their Service Level Agreement. If a network device that is downstream of the customer's devices experiences congestion or receives a PAUSE message, that device will automatically transmit a PAUSE message to the customer's devices causing the devices to temporarily stop transmitting packets. Since the customer's devices are operating at or below their guaranteed service rate, the downstream device unnecessarily restricts the flow of traffic from the customer's devices. Requiring network devices that are operating within their guaranteed service rate to temporarily stop transmitting packets leads to an unfavorable impact on the service contract.

Accordingly, there is a need in the art for systems and methods that improve flow control in an Ethernet-based networking environment.

SUMMARY OF THE INVENTION

Systems and methods consistent with the principles of the invention address this and other needs by providing a flow control procedure that selectively applies flow control to only those devices operating above a guaranteed service level.

In an implementation consistent with the present invention, a method for controlling a flow of traffic in a network is disclosed. The method includes detecting congestion in the network; identifying, in response to the detecting, one or more upstream nodes to which to transmit flow control messages based on a control policy; and transmitting the flow control messages to the identified one or more upstream nodes.

In another implementation consistent with the present invention, a network device includes at least one output interface, a memory configured to store at least one control policy, a link monitoring unit configured to monitor traffic flow transmitted from the at least one output interface, and a flow control unit. The flow control unit detects congestion on the at least one output interface based on the monitoring, identifies one or more upstream network devices to which to transmit a flow control signal based on the at least one control policy, and transmits the flow control signal to the one or more upstream network devices.

In yet another implementation consistent with the present invention, a method for controlling the flow of traffic in a network is disclosed. The method includes detecting congestion in the network and identifying at least one upstream device to which to send a flow control message, where the at least one upstream device is a device that is transmitting above a predetermined level. The method further includes transmitting the flow control message to the identified upstream device, where the flow control message instructs the identified upstream device to slow down transmissions to the network device.

In still another implementation consistent with the present invention, a network device includes at least two input interfaces, at least one output interface, a link monitoring unit, and a flow control unit. The link monitoring unit monitors traffic flow received at the at least two input interfaces and traffic flow transmitted from the at least one output interface. The flow control unit detects congestion on the at least one output interface based on the monitoring of the at least one output interface, identifies one or more upstream network devices to which to transmit a flow control signal based on the monitoring of the least two input interfaces, and transmits the flow control signal to the one or more upstream network devices.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide systems and methods for selectively performing flow control in a communications network. When a network device detects congestion on one of its outgoing links, the network device identifies one or more upstream devices to which a flow control message, such as a PAUSE message, is to be transmitted. In one implementation, the network device identifies those upstream nodes whose traffic flow is above a guaranteed service rate. The network device then transmits the flow control message to the identified upstream nodes.

Exemplary Network

Figure 1:
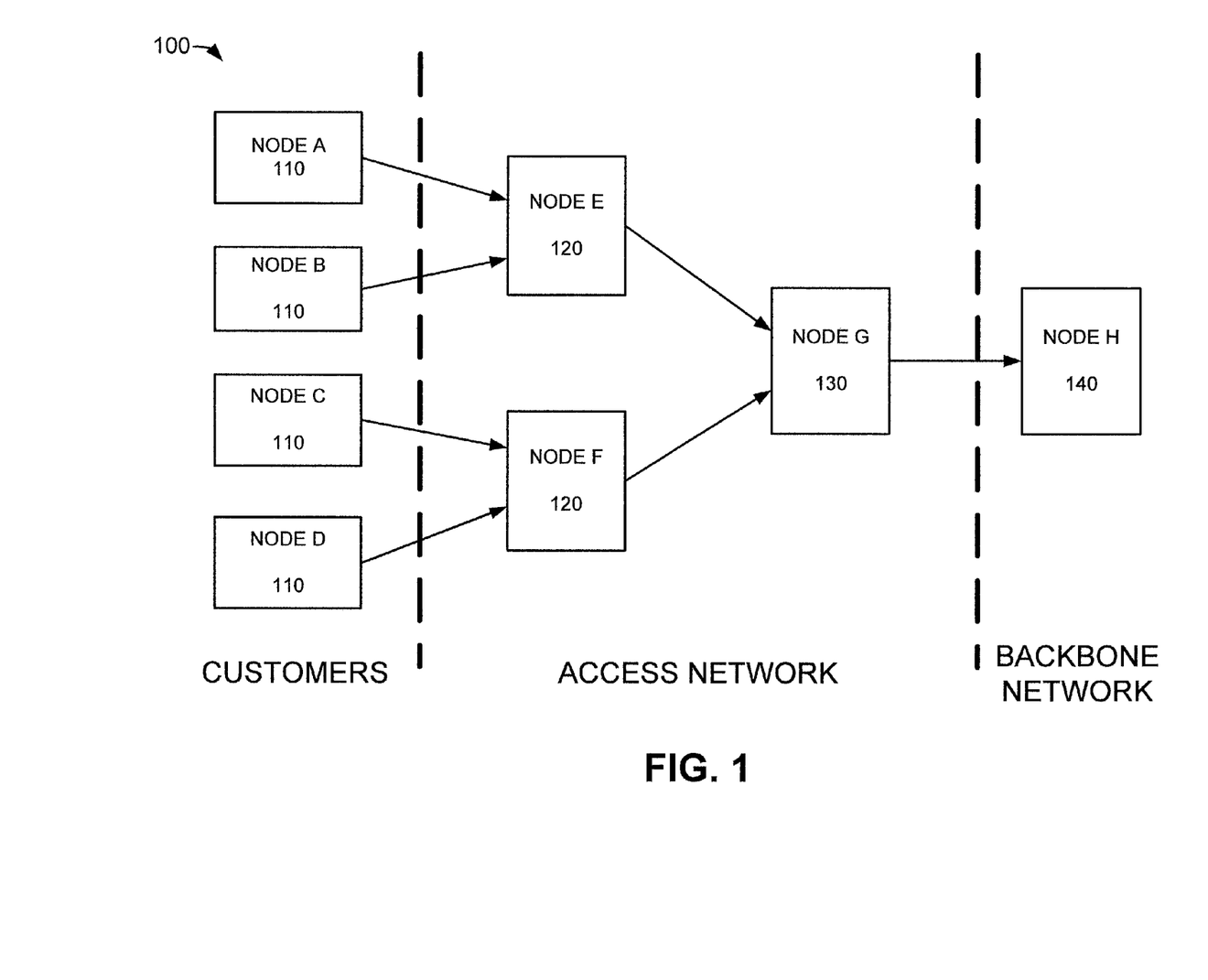
FIG. 1 illustrates an exemplary network in which systems and methods, consistent with the present invention, may be implemented.

FIG. 1 illustrates an exemplary network 100 in which systems and methods, consistent with the present invention, may be implemented. As illustrated, the network 100 includes a group of customer nodes 110, access nodes 120, an aggregate node 130, and a backbone network node 140. For simplicity, it is assumed herein that the access network provides Ethernet access for Internet applications, and that the backbone network provides Internet Protocol (IP) routing functionalities. It will be appreciated, however, that the present invention is not so limited.

The customer nodes 110 (nodes A-D) may include devices, such as mainframes, minicomputers, personal computers, laptops, personal digital assistants, or any other device that is capable of transmitting data through the network 100. The customer nodes 110 may also include one or more switching or routing devices. In one embodiment, the customer nodes 110 connect to the access nodes 120 via a high-speed connection, such as a T-1, T-3, OC-3, OC-12, etc. connection.

The access nodes 120 transmit data between the customer nodes 110 and the aggregate node 130 in a well-known manner. In an exemplary implementation, the access nodes 120 may include a Synchronous Optical Network/Synchronous Digital Hierarchy (SONET/SDH) transport node, a SONET/SDH add-drop multiplexing (ADM) node with Ethernet-over-SONET (EoS) interfaces, an Ethernet switching node, a Resilient Packet Ring (RPR) device, and/or an Internet Protocol/Multiprotocol Label Switching (IP/MPLS) routing/switching node.

The aggregate node 130 may include one or more devices for combining data from the access nodes 120 and transmitting the data to the backbone network. Aggregate node 130 may include a SONET/SDH transport node, a SONET/SDH ADM node with EoS interfaces, an Ethernet switching node, a RPR device, and/or an Internet Protocol/Multiprotocol Label Switching (IP/MPLS) routing/switching node. It will be appreciated that in some implementations, the aggregate node 130 may also serve as an access node (e.g., customer nodes 110 may directly connect to an aggregate node 130).

The backbone node 140 may include one or more devices for receiving data from the aggregate node 130 and transmitting the data through the backbone network. In one implementation, the backbone node 140 may include an edge router.

The access nodes 120, aggregate node 130, and the backbone node 140 may connect via, for example, Ethernet, Fast Ethernet, gigabit Ethernet (GbE), 10GbE, T-1, T-3, OC-3, OC-12, OC-48, OC-192, etc. The nodes may communicate using any number of protocols, such as the Ethernet, EoS, Packet Over SONET (POS), and RPR protocols.

Four customer nodes 110, two access nodes 120, one aggregate node 130, and one backbone network node 140 have been shown for simplicity. A typical network may include more or fewer nodes than illustrated in FIG. 1. Moreover, a typical network may include multiple stages of aggregate nodes (i.e., an aggregate node may receive data from other aggregate nodes).

Exemplary Customer Node

Figure 2:
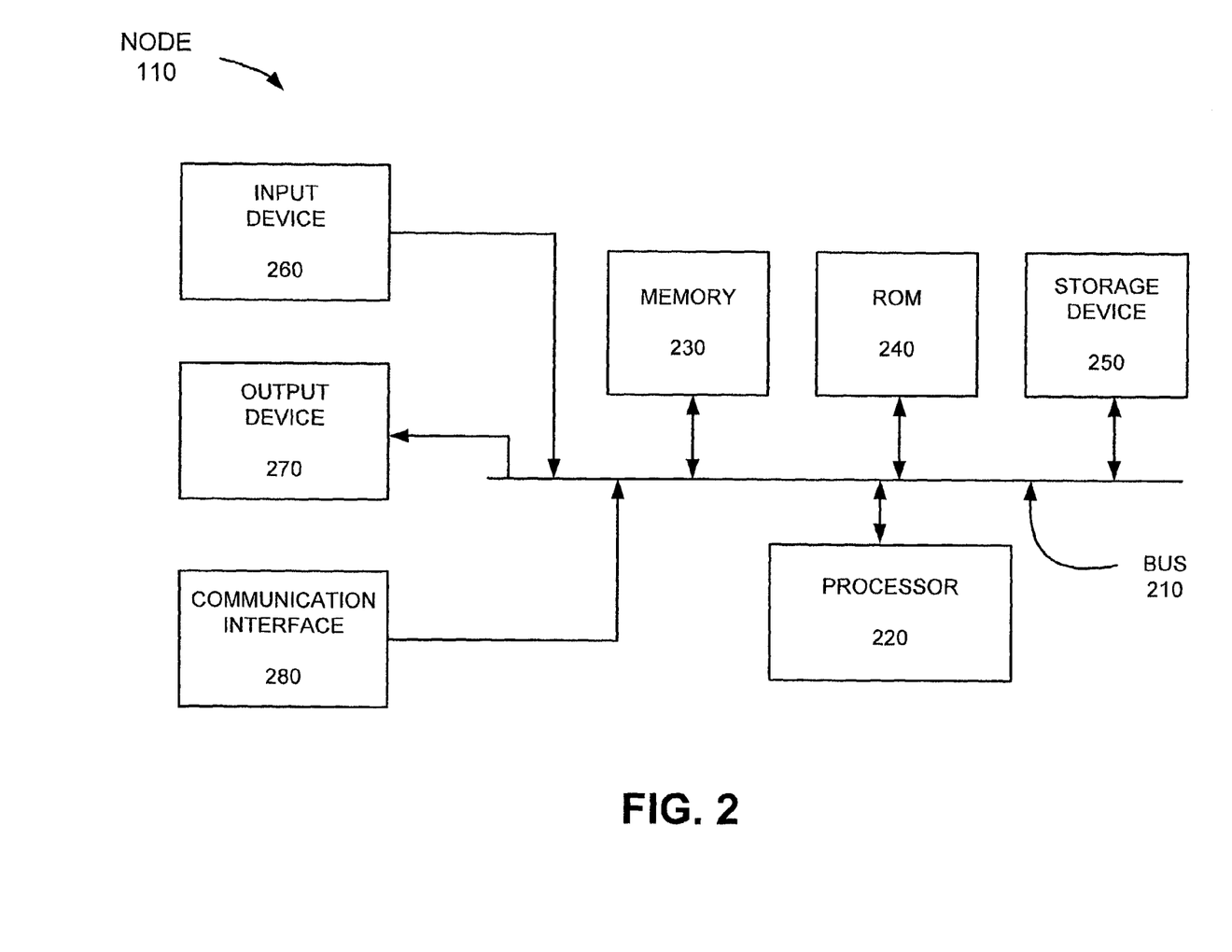
FIG. 2 illustrates an exemplary configuration of the customer node of FIG. 1 in an implementation consistent with the present invention.

FIG. 2 illustrates an exemplary configuration of the customer node 110 of FIG. 1 in an implementation consistent with the present invention. In FIG. 2, the customer node 110 includes a bus 210, a processor 220, a memory 230, a read only memory (ROM) 240, a storage device 250, an input device 260, an output device 270, and a communication interface 280. The bus 210 may include one or more conventional buses that permit communication among the components of the customer node 110.

The processor 220 may include any type of conventional processor or microprocessor that interprets and executes instructions. The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism or combination of mechanisms that permits the operator to input information to the customer node 110, such as a keyboard, a mouse, a microphone, a pen, a biometric input device, such as a voice recognition device, etc. The output device 270 may include any conventional mechanism or combination of mechanisms that outputs information to the operator, including a display, a printer, a speaker, etc.

The communication interface 280 may include any transceiver-like mechanism that enables the customer node 110 to communicate with other devices and/or systems, such as access nodes 120. For example, the communication interface 280 may include a modem or an Ethernet interface.

Exemplary Access Node

Figure 3:
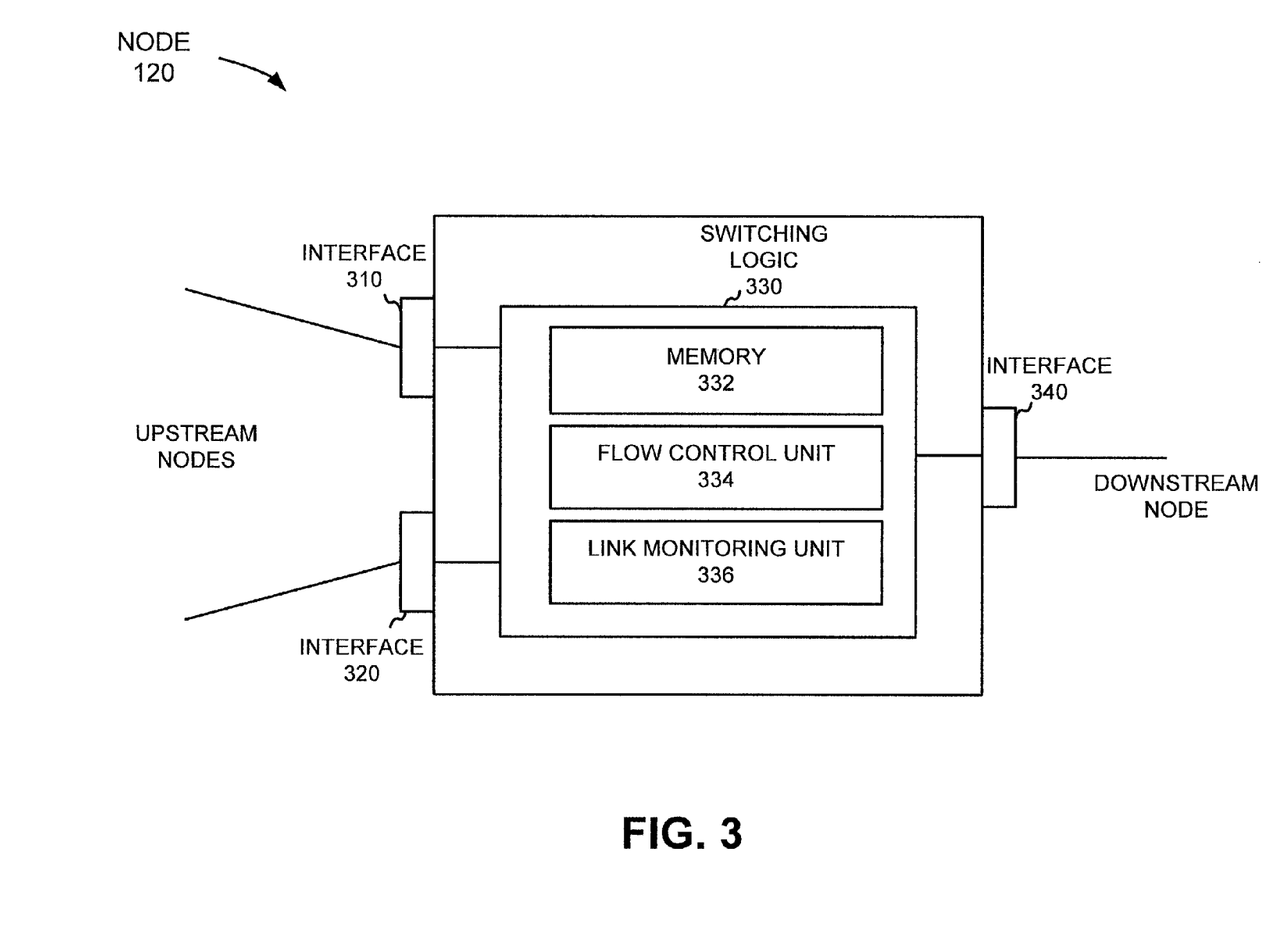
FIG. 3 illustrates an exemplary configuration of the access node of FIG. 1 according to an implementation consistent with the present invention.

FIG. 3 illustrates an exemplary configuration of the access node 120 of FIG. 1 according to an implementation consistent with the present invention. It will be appreciated that the aggregate node 130 may be similarly configured. As illustrated, node 120 includes interfaces 310, 320, and 340 and switching logic 330. Node 120 may include additional mechanisms (not shown) that aid in the reception, processing, or transmission of data. Three interfaces have been shown for simplicity. A typical node 120 may include more or fewer interfaces than illustrated in FIG. 3.

Interfaces 310, 320, and 340 may include one or more mechanisms that allow node 120 to receive data, temporarily store data, and transmit data to a node connected to that particular interface. For example, interface 310 may include one or more buffers for storing data received from or to be transmitted to customer node A 110. Interface 320 may include one or more buffers for storing data received from or to be transmitted to customer node B 110. Similarly, interface 340 may include one or more buffers for storing data received from or to be transmitted to node G 130. Interfaces 310, 320, and 340 may also include logic for processing data. In one implementation, interfaces 310, 320, and 340 may include an IEEE 802.3 conformant interface or another similar type of interface.

Switching logic 330 may include one or more mechanisms for processing data received via interfaces 310, 320, and 340 in a well-known manner and for switching the data to the appropriate interface for transmission through the network 100. As will be described in additional detail below, switching logic 330 may also include a memory 332 that stores a set of control policies, a flow control unit 334 that decides, based on the policies, how to process flow control messages, and a link monitoring unit 336 that monitors the traffic flow on the incoming and outgoing links in a well-known manner. Flow control unit 334 and link monitoring unit 336 may be implemented in hardware, software, or a combination of hardware and software.

Exemplary Processing

Figure 4:
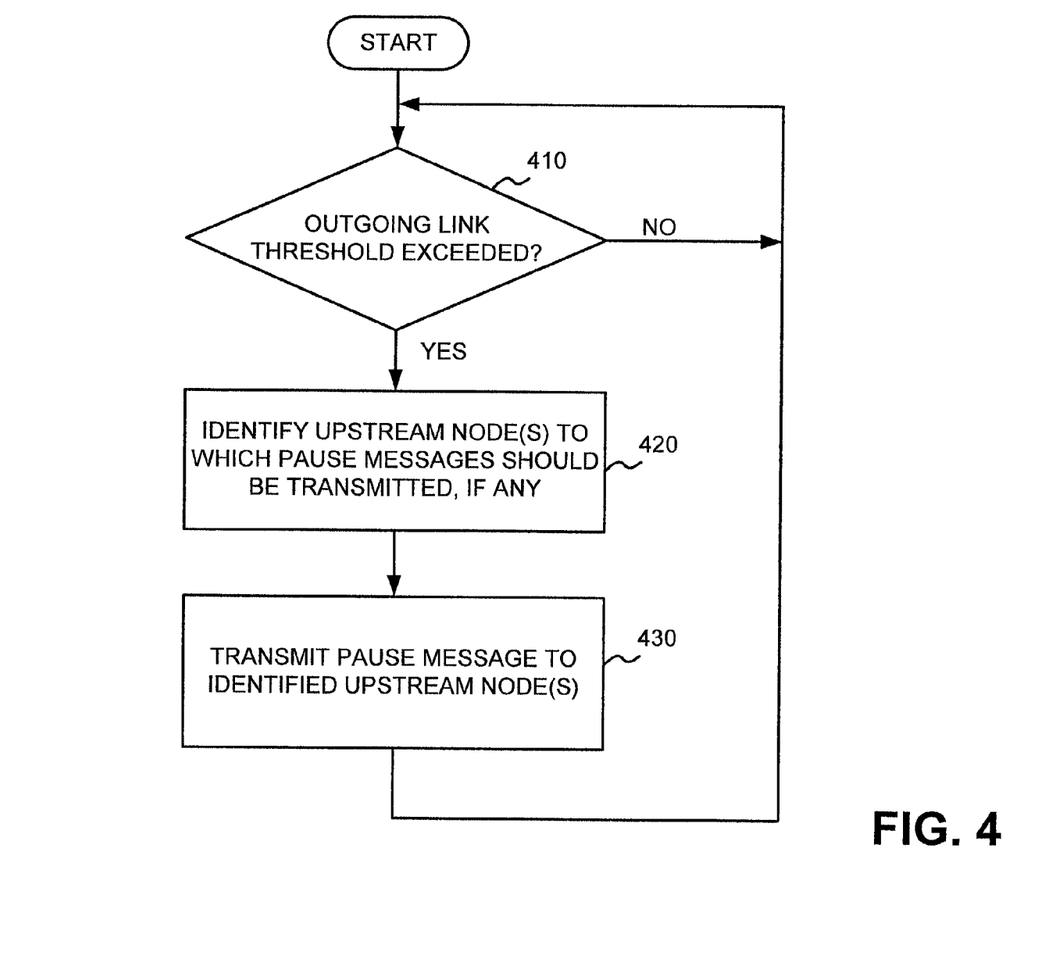
FIG. 4 illustrates an exemplary process for performing selective traffic flow control according to an implementation consistent with the present invention.
Figure 5:
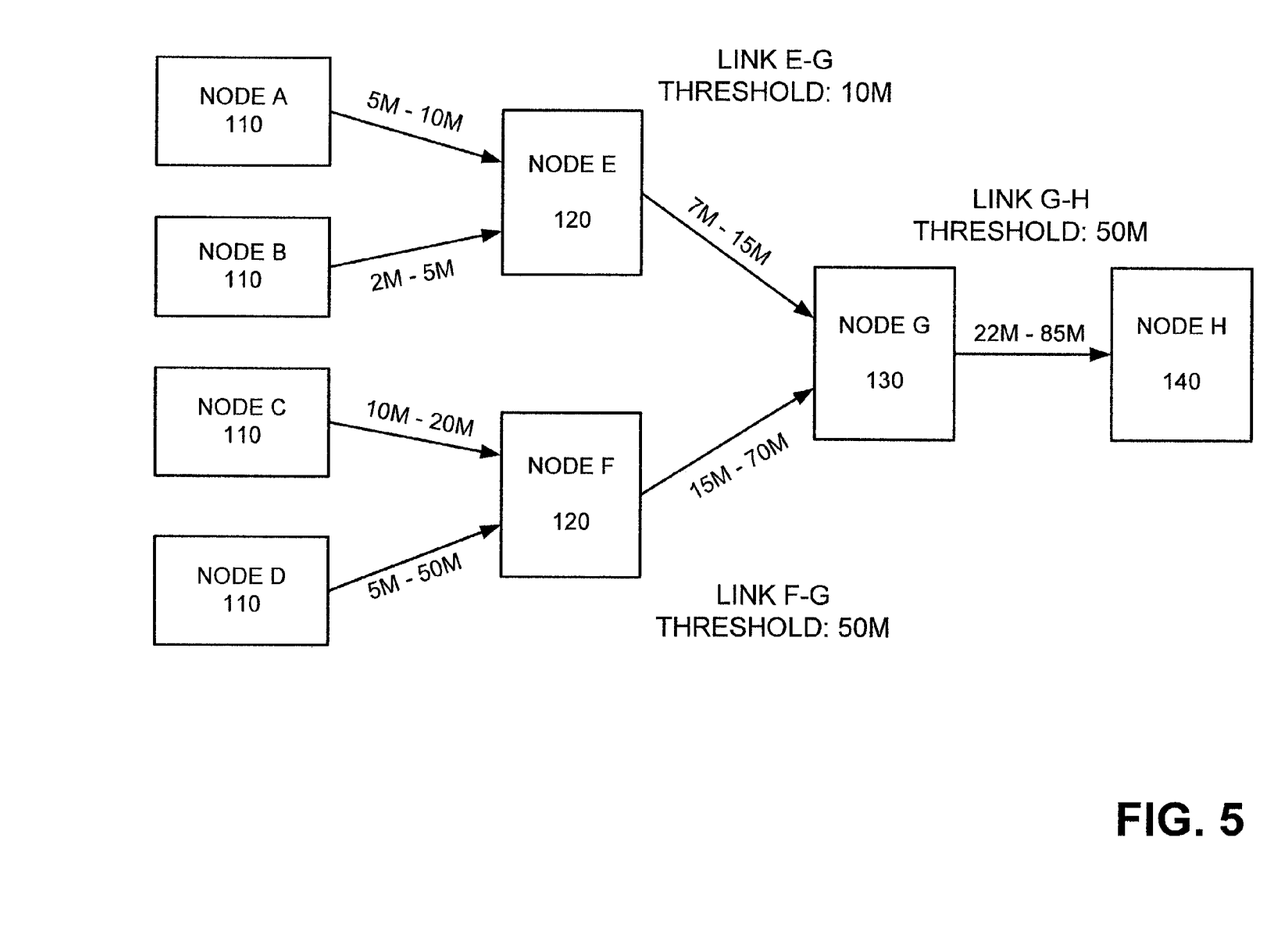
FIG. 5 illustrates exemplary guaranteed service rates and maximum burst rates that may be assigned to the nodes of FIG. 1.

FIG. 4 illustrates an exemplary process for performing selective traffic flow control according to an implementation consistent with the present invention. To facilitate the description that follows, reference will be made to FIG. 5. FIG. 5 illustrates exemplary guaranteed service rates and maximum burst rates that may be assigned to the nodes of FIG. 1.

For the foregoing description, it is assumed, for explanatory purposes only, that the service contract between the service provider and Customer A 110 consists of a guaranteed service rate of 5 Mbps and a maximum burst rate of 10 Mbps, among other specifications, such as various performance measurements. This range is illustrated in FIG. 5 as "5M-10M." The guaranteed service rate is the rate that is guaranteed for the traffic flow between a customer and the service provider's network (i.e., the customer can use up to the guaranteed service rate specified in the service contract). The maximum burst rate is the maximum rate that is allowed for the traffic flow between a customer and the service provider's network. The value of the maximum burst rate is generally greater than the value of the guaranteed service rate. Since the maximum burst rate is not guaranteed, that rate may not be available to the customer at all times. Exemplary guaranteed service rates and maximum burst rates for the other Customers B-D 110 are illustrated in FIG. 5.

For network-bound traffic, the aggregated bandwidth requirements of the outgoing links of the access nodes 120 and aggregate node 130 are illustrated in FIG. 5. These values are determined based on the guaranteed service rates and maximum burst rates associated with Customers A-D 110. For example, at the link between Node F and G, the aggregated guaranteed service rate is 10+5=15 Mbps (i.e., the sum of the guaranteed service rates of Customers C and D 110), and the aggregated maximum burst rate is 20+50=70 Mbps (i.e., the sum of the maximum burst rates of Customers C and D 110).

In FIG. 5, the link threshold capacity is a configurable value that represents the maximum bandwidth allowed for accommodating traffic from all the upstream customers towards any access node and beyond. In the exemplary network illustrated in FIG. 5, assume that the threshold between Nodes E and G is 10 Mbps, the threshold between Nodes F and G is 50 Mbps, and the threshold between Nodes G and H is 50 Mbps. In practice, the value of the threshold should be greater than or equal to the aggregated guaranteed service rate to meet that part of the service contracts for all upstream customers, and should not exceed the aggregated maximum burst rate in order to gain economical benefits from the network.

Returning now to FIG. 4, processing may begin with an access node 120 (or aggregate node 130) determining whether the link threshold associated with an outgoing link of that node has been exceeded [act 410]. For example, node E 120 (FIG. 5) may determine whether the traffic flow on the outgoing link (i.e., link E-G) exceeds the link threshold of 10 Mbps. The node 120 may make this determination based on information obtained by link monitoring unit 336. If the node 120 determines that the outgoing link threshold has not been exceeded (e.g., the traffic flow on link E-G is less than or equal to 10 Mbps), then processing may return to act 410.

If, on the other hand, the node 120 determines that the outgoing link threshold has been exceeded, the node 120 may identify, based on one of the control policies stored in memory 332, one or more upstream nodes to which to transmit a flow control message to cause those identified upstream nodes to slow or temporarily stop traffic transmissions [act 420]. In an exemplary implementation, the flow control message includes a PAUSE message according to IEEE Std 802.3, 2000 Edition (Incorporating IEEE Std 802.3, 1998 Edition, IEEE Std 802.3ac-1998, IEEE Std 802.3ab-1999, and 802.3ad-2000). The control policies may instruct the node 120 to transmit flow control messages to all upstream nodes or to selectively transmit flow control messages to one or more upstream nodes. In one implementation, aggregate nodes 130 may store control policies instructing the aggregate nodes to transmit flow control messages to all upstream nodes, and access nodes 120 may store control policies instructing the access nodes to transmit flow control messages to select upstream nodes. In other implementations, the access and aggregate nodes may include control policies that instruct the nodes to transmit flow control messages to select upstream nodes.

Assume that the control policy instructs the node 120 to transmit a flow control message to select upstream nodes. To identify the upstream nodes to which a flow control message is to be transmitted, the node 120 may identify those upstream nodes whose traffic exceeds their guaranteed service rate. For example, assume that the network-bound traffic from Customer A 110 is presently 10 Mbps and that the network-bound traffic from Customer B 110 is presently 2 Mbps. Node E 120 may detect that the link E-G threshold of 10 Mbps has been exceeded. In response, node E 120 may determine whether the network-bound traffic from Customer A 110 exceeds their guaranteed service rate of 5 Mbps and whether the network-bound traffic from Customer B 110 exceeds their guaranteed service rate of 2 Mbps. In the example above, node E 120 would determine that Customer A 110 has exceeded their guaranteed service rate and that Customer B 110 has not.

Once the node 120 has identified one or more upstream nodes to which to send flow control messages, the node 120 may transmit the flow control messages to the identified upstream nodes [act 430]. In the example above, node E 120 may transmit a flow control message to Customer A 110. Processing may then return to act 410.

FIGS. 6-10 provide examples that illustrate the above-described processing. In these examples, it is assumed that Customer nodes A-D 110, access nodes E and F 120, and aggregate node G 130 are associated with guaranteed service rates, maximum burst rates, and link thresholds described above with respect to FIG. 5. Moreover, in all but the last scenario, it is assumed that each of nodes 120 and 130 contains a control policy that instructs the node to perform selective flow control (i.e., send flow control messages to select upstream nodes). In the last scenario, illustrated in FIG. 10, it is assumed that the aggregate node 130 contains a control policy that instructs that node to transmit flow control messages to all upstream nodes. The access nodes 120 in that scenario perform selective flow control.

Figure 6:
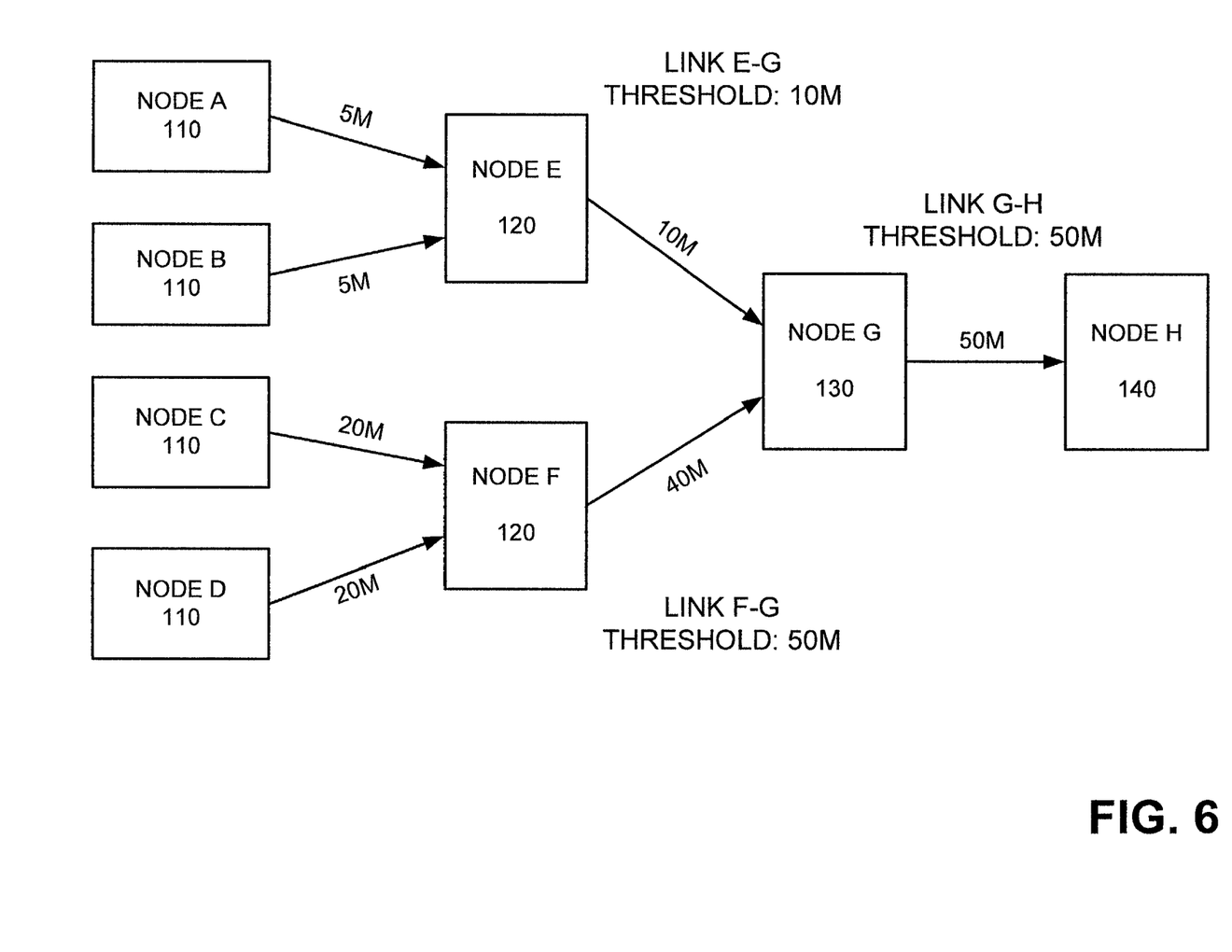
FIGS. 6-10 illustrate exemplary traffic scenarios in an implementation consistent with the present invention.

FIG. 6 illustrates a first exemplary traffic scenario in an implementation consistent with the present invention. In FIG. 6, assume that the network-bound traffic from Customers A-D 110 is 5 Mbps, 5 Mbps, 20 Mbps, and 20 Mbps, respectively. Therefore, the aggregated traffic on the outgoing links of nodes E and F 120 would then be 10 Mbps and 40 Mbps, respectively. Moreover, the aggregated traffic on the outgoing link of node G 130 would be 50 Mbps. Since the aggregated traffic in the network is at or below the permissible threshold levels, no flow control would be performed in this scenario.

Figure 7:
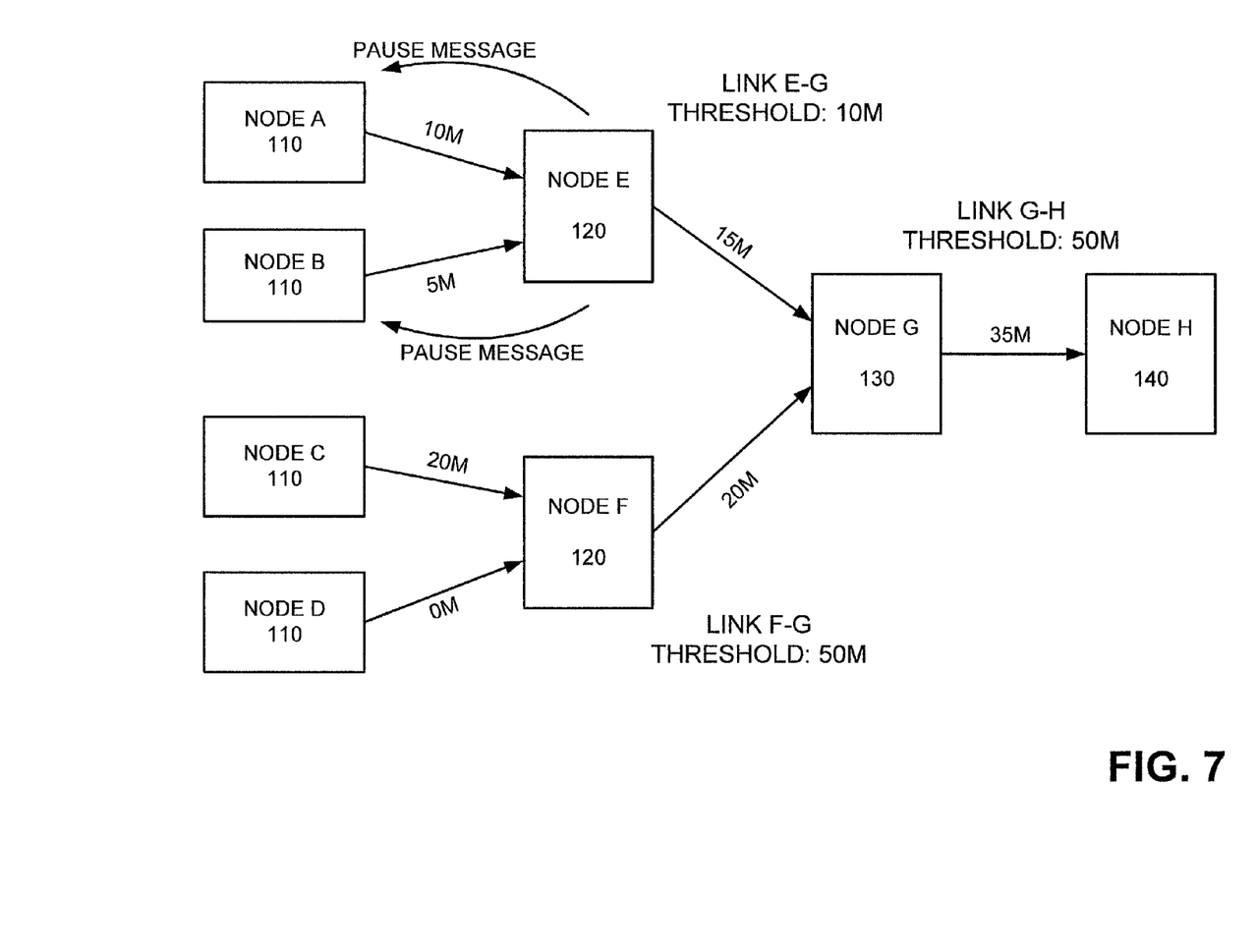

FIG. 7 illustrates a second exemplary traffic scenario in an implementation consistent with the present invention. In FIG. 7, assume that the network-bound traffic from Customers A-D 110 is 10 Mbps, 5 Mbps, 20 Mbps, and 0 Mbps, respectively. Therefore, the aggregated traffic flow on the outgoing links of nodes E and F 120 would then be 15 Mbps and 20 Mbps, respectively. Moreover, the aggregated traffic on the outgoing link of node G 130 would be 35 Mbps.

In this situation, node E 120 detects that the aggregated traffic on link E-G is above the permissible threshold of 10 Mbps and then determines whether the network-bound traffic from Customers A and B 110 exceeds their guaranteed service rates. Here, node E 120 determines that the network-bound traffic from both Customers A and B 110 exceeds their guaranteed service rates of 5 Mbps and 2 Mbps, respectively. As a result, node E sends a PAUSE message to both Customer A 110 and Customer B 110. In response, Customers A and B 110 slow down or temporarily cease their respective traffic flows toward the network.

In one implementation, node E 120 may continue the control action until the traffic rate on the outgoing link E-G reaches a value less than or equal to 10 Mbps, which is the link E-G threshold capacity. Other possible control actions may include sending a PAUSE message to Customer A 110 until the traffic rate from Customer A 110 reaches a value less than or equal to 5 Mbps, which is the guaranteed rate for Customer A 110; and sending a PAUSE message to Customer B 110 until the traffic rate from Customer B 110 reaches a value less than or equal to 2 Mbps, which is the guaranteed rate for Customer B 110.

It will be appreciated that node E 120 may stop sending the PAUSE message before the traffic flow on link A-E reaches 5 Mbps and/or before the traffic flow on link B-E reaches 2 Mbps. Node E 120 may stop the control action when the traffic flow on the outgoing link E-G reaches a value less than or equal to 10 Mbps (the threshold value). Additionally, node E 120 may start the control action immediately after the outgoing rate reaches a value higher than the threshold on link E-G (i.e., prior to the aggregate traffic flow on link E-G reaching 15 Mbps).

Figure 8:
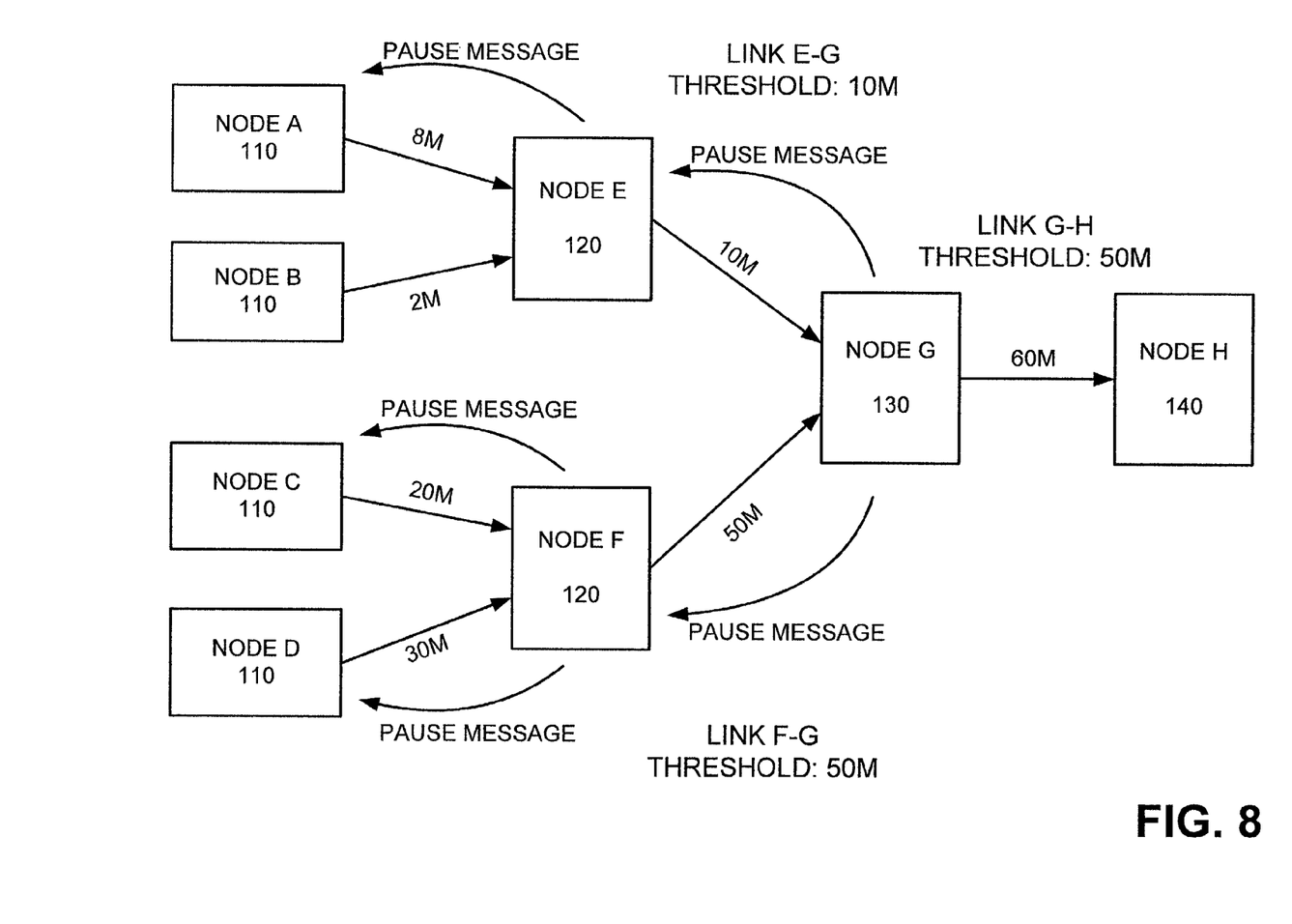

FIG. 8 illustrates a third exemplary traffic scenario in an implementation consistent with the present invention. In FIG. 8, assume that the network-bound traffic from Customers A-D 110 is 8 Mbps, 2 Mbps, 20 Mbps, and 30 Mbps, respectively. Therefore, the aggregated traffic flow on the outgoing links of nodes E and F 120 would then be 10 Mbps and 50 Mbps, respectively. Moreover, the aggregated traffic on the outgoing link of node G 130 would be 60 Mbps.

Since the aggregated traffic flow leaving node G 130 is above the link G-H threshold of 50 Mbps, node G 130 begins the flow control procedure described above with regard to FIG. 4. Node G 130 may determine whether the traffic flows from nodes E and F 120 exceed their aggregated guaranteed service rates of 7 Mbps and 15 Mbps, respectively. In the present scenario, node G 130 would determine that the traffic flows from both node E 120 and node F 120 exceed their aggregated guaranteed service rates. In response, assume that node G 130 transmits PAUSE messages to nodes E and F 120. In one implementation, node G 130 may continue to transmit PAUSE messages to nodes E and F 120 until the traffic flow on node G's outgoing link (i.e., link G-H) reaches a value less than or equal to 50 Mbps (the link G-H threshold).

Upon receiving the PAUSE message, nodes E and F 120 perform the acts described above with respect to FIG. 7. The only difference is in the last scenario, a threshold overrun (or in another implementation, a potential threshold overrun) triggered the flow control procedure performed by node E 120. In the current scenario, it is a PAUSE message received from the downstream node (i.e., node G 130) that causes the flow control procedure to be performed by nodes E and F 120.

Upon receiving the PAUSE message from node G 130, node E 120 may identify one or more upstream nodes to which to send PAUSE messages. Node E 120 may, for example, send PAUSE messages to one of the upstream nodes, (i.e., Customer A 110), since only this customer is transmitting traffic above the respective guaranteed rate. In response, Customer A 110 may slow down or temporarily stop the flow of network-bound traffic. Node E 120 may stop sending PAUSE messages before the traffic flow on link A-E reaches 5 Mbps.

Node F 120 may perform similar actions. For example, node F 120 may, upon receiving the PAUSE message from node G 130, send PAUSE messages to both upstream nodes, i.e., Customers C and D 110, since both are transmitting traffic above the respective guaranteed rate. Customers C and D 110 may then slow down or temporarily stop the flow of network-bound traffic. Node F 120 may stop sending PAUSE messages before the traffic flow on links C-F and D-F reach their guaranteed service rates.

Figure 9:
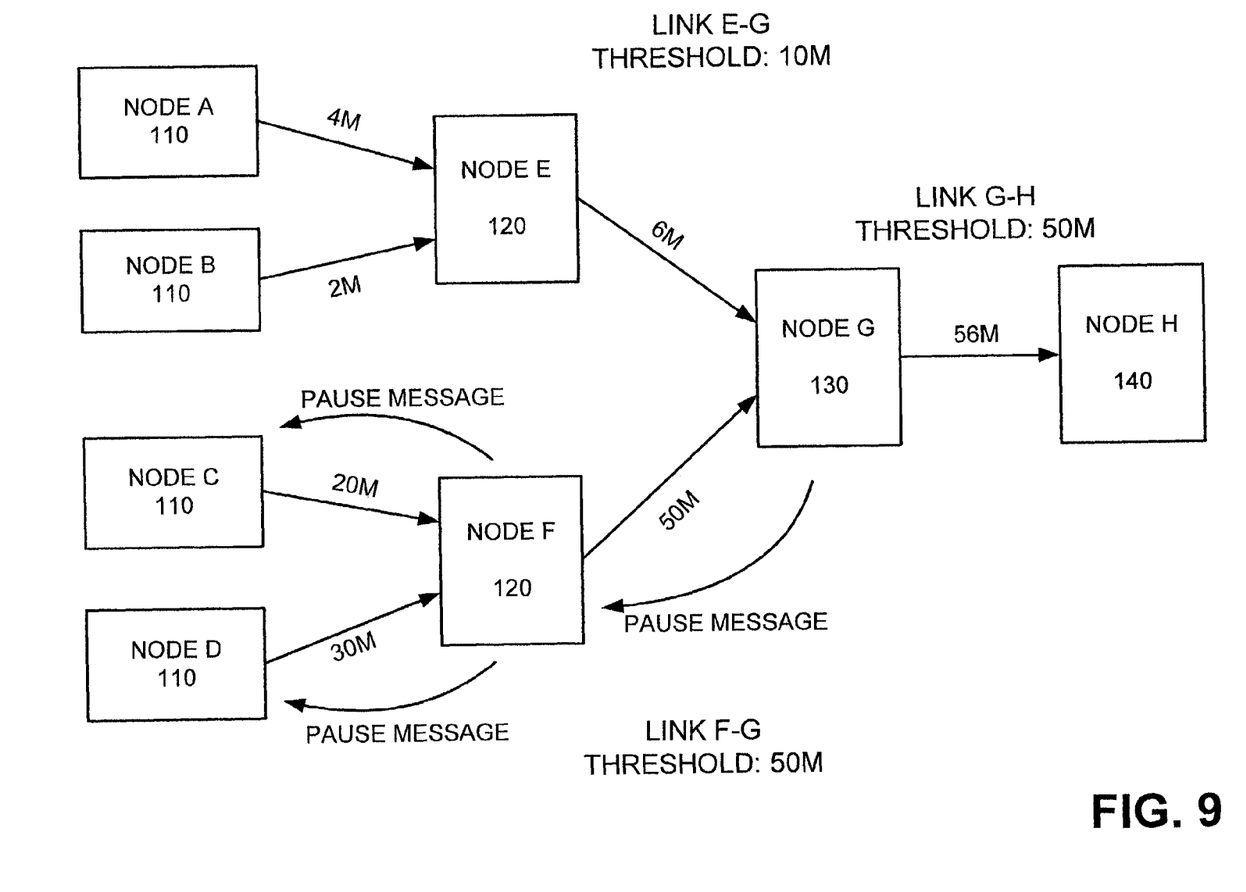

FIG. 9 illustrates a fourth exemplary traffic scenario in an implementation consistent with the present invention. In FIG. 9, assume that the network-bound traffic from Customers A-D 110 is 4 Mbps, 2 Mbps, 20 Mbps, and 30 Mbps, respectively. Therefore, the aggregated traffic flow on the outgoing links of nodes E and F 120 would then be 6 Mbps and 50 Mbps, respectively. Moreover, the aggregated traffic on the outgoing link of Node G 130 would be 56 Mbps.

Since the aggregated traffic flow leaving node G 130 is above the link G-H threshold of 50 Mbps, node G 130 begins the flow control procedure described above with respect to FIG. 4. Node G 130 may determine whether the traffic flows from nodes E and F 120 exceed their aggregated guaranteed service rates of 7 Mbps and 15 Mbps, respectively. In the present scenario, node G 130 would determine that the traffic flows from only node F 120 exceeds its aggregated guaranteed service rate. In response, assume that node G 130 transmits a PAUSE message to node F 120. In one implementation, node G 130 may continue to transmit PAUSE messages to node F 120 until the traffic flow on node G's outgoing link (i.e., link G-H) reaches a value less than or equal to 50 Mbps (the link G-H threshold).

Upon receiving the PAUSE message, node F 120 performs the acts described above with respect to FIG. 8. Upon receiving the PAUSE message from node G 130, node F 120 may identify one or more upstream nodes to which to send PAUSE messages. Node F 120 may, for example, send PAUSE messages to both upstream nodes, (i.e., Customers C and D 110), since both customers are transmitting traffic above the respective guaranteed rates. In response, Customers C and D 110 may slow down or temporarily stop the flow of network-bound traffic. Node F 120 may stop sending PAUSE messages before the traffic flow on links C-F and D-F reach their guaranteed service rates.

Figure 10:
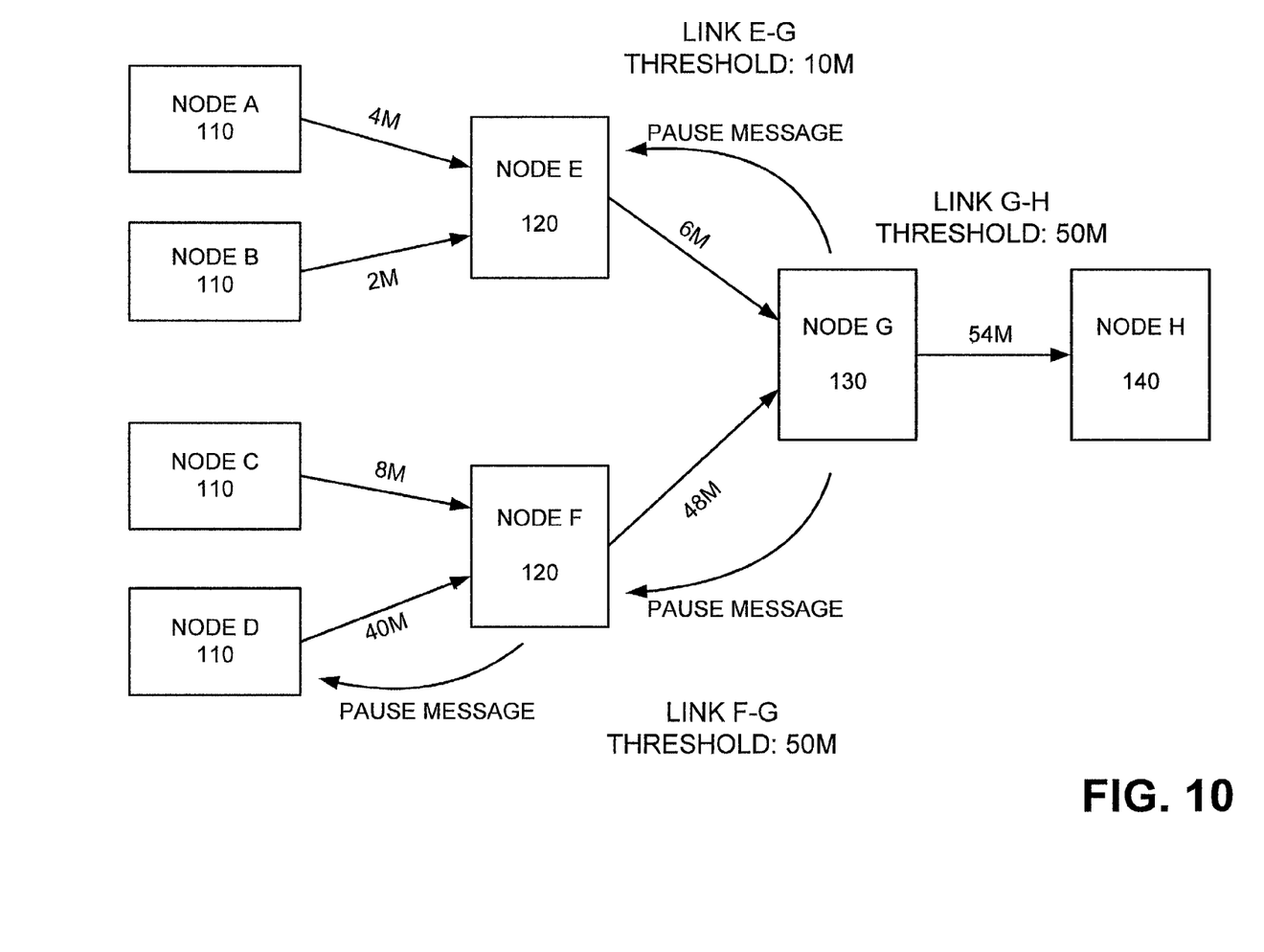

FIG. 10 illustrates a fifth exemplary traffic scenario in an implementation consistent with the present invention. It is assumed in this scenario that the aggregate node G 130 contains a control policy that instructs the node 130 to transmit PAUSE messages to all upstream nodes, while the access nodes E and F 120 contain control policies that instruct those nodes to perform selective flow control. Moreover, assume that the network-bound traffic from Customers A-D 110 is 4 Mbps, 2 Mbps, 8 Mbps, and 40 Mbps, respectively. Therefore, the aggregated traffic flow on the outgoing links of nodes E and F 120 would then be 6 Mbps and 48 Mbps, respectively. The aggregated traffic on the outgoing link of Node G 130 would be 54 Mbps.

Since the aggregated traffic flow leaving node G 130 is above the link G-H threshold of 50 Mbps, node G 130 performs the flow control procedure indicated by its control policy. Here, node G 130 transmits PAUSE messages to both node E 120 and node F 120 even though the traffic flow out of node E is below the aggregated guaranteed service rate. In one implementation, node G 130 may continue to transmit PAUSE messages to nodes E and F 120 until the traffic flow on node G's outgoing link (i.e., link G-H) reaches a value less than or equal to 50 Mbps (the link G-H threshold).

Upon receiving the PAUSE message, node E 120 may identify one or more upstream nodes to which to send PAUSE messages. Since Customers A and B 110 are operating below their guaranteed service rates of 5 Mbps and 2 Mbps, respectively, node E may simply ignore the PAUSE message. That is, node E 120 may determine that no PAUSE messages are to be transmitted to Customers A and B 110.

Node F 120, on the other hand, may perform the acts described above with respect to FIG. 8. Upon receiving the PAUSE message from node G 130, node F 120 may identify one or more upstream nodes to which to send PAUSE messages. Node F 120 may, for example, send PAUSE messages to Customer D, since only that customer is transmitting traffic above the respective guaranteed rates. In response, Customer D 110 may slow down or temporarily stop the flow of network-bound traffic. Node F 120 may stop sending PAUSE messages before the traffic flow on link D-F reaches its guaranteed service rate.

It will be appreciated that in some instances, Customers A-D 110 may ignore the PAUSE messages sent by nodes E and F 120 and continue transmitting traffic at a rate higher than the guaranteed service rate. In such a situation, the downstream access node 120 may drop the excessive traffic as a last resort if the congestion at that node 120 or a downstream node persists.

CONCLUSION

Systems and methods, consistent with the present invention, provide selective flow control in a communications network. When a network device detects congestion on one of its outgoing links, the network device identifies one or more upstream devices to which a flow control message, such as a PAUSE message, is to be transmitted. In one implementation, the network device identifies those upstream nodes whose traffic flow is above a guaranteed service rate. The network device then transmits the flow control message to the identified upstream nodes. Such intelligent flow control processing improves network performance particularly in the presence of bursty traffic in any Ethernet-based networks.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above flow control techniques were described as being implemented in an Ethernet environment, the present invention is not so limited. In fact, implementations consistent with the present invention are equally applicable to any networking environment in which the control of traffic flow is desired.

Moreover, while the flow control unit, link monitoring unit, and control policies were described as being located within the switching logic of the node, the flow control unit, link monitoring unit, and control policies may, in an alternative implementation, be located within the interfaces of the node.

Additionally, while the above description focussed on performing flow control on a per port basis, the present invention is not so limited. For example, implementations consistent with the present invention are equally applicable to performing flow control on a per priority queue (e.g., ANSI/IEEE Std. 802.1D, 1998 Edition) and/or per VLAN (e.g., IEEE Std. 802.1Q, 1998 Edition) basis within a physical port or across multiple physical ports.

It will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device comprising:
   at least two input interfaces;
   at least one output interface;
   a link monitoring unit configured to:
      monitor traffic flow received at the at least two input interfaces, and
      monitor traffic flow transmitted from the at least one output interface; and
   a flow control unit configured to:
      detect congestion on the at least one output interface based on the monitoring of the at least one output interface, and
      selectively transmit a flow control signal to one or more upstream network devices, the one or more upstream network devices including network devices that are transmitting above a guaranteed service rate.

2. The network device of claim 1 wherein the flow control signal includes a PAUSE message.

3. The network device of claim 1 wherein, when detecting congestion, the flow control device is configured to:

detect congestion when a traffic flow on the at least one output interface exceeds a threshold.

4. The network device of claim 3 wherein the threshold is configurable.

5. A method for controlling a flow of traffic in a network, the method, performed by a node in the network, comprising:
 detecting congestion in the network; and
 selectively transmitting flow control messages to one or more upstream nodes, the one or more upstream nodes including nodes that are transmitting above a guaranteed service rate.

6. The method of claim 5 wherein the network includes an Ethernet-based network.

7. The method of claim 6 wherein the flow control messages includes PAUSE messages.

8. The method of claim 5 wherein the detecting includes:
 detecting congestion on an outgoing link of the node.

9. The method of claim 5 wherein the detecting includes:
 receiving a flow control message from a downstream node.

10. The method of claim 5 wherein the node includes at least one of a Synchronous Optical Network/Synchronous Digital Hierarchy (SONET/SDH) transport device, a SONET/SDH add-drop multiplexing (ADM) node with Ethernet-over-SONET (EoS) interfaces, an Ethernet switching node, a Resilient Packet Ring (RPR) device, or an Internet Protocol/Multiprotocol Label Switching (IP/MPLS) routing/switching node.

11. The method of claim 5 further comprising:
 receiving the flow control messages at the one or more upstream nodes; and
 performing a flow control action based on the received flow control message.

12. The method of claim 11 wherein the performing a flow control action includes one of:
 propagating the flow control message to at least one upstream node,
 pausing data transmissions to the node, or
 ignoring the flow control message.

13. A network device comprising:
 at least one output interface;
 a memory configured to store at least one control policy;
 a link monitoring unit configured to monitor traffic flow transmitted from the at least one output interface; and
 a flow control unit configured to:
  detect congestion on the at least one output interface based on the monitoring,
  identify one or more upstream network devices to which to transmit a flow control signal based on the at least one control policy, the control policy causing the flow control unit to identify upstream network devices that are transmitting above a predetermined threshold, and
  transmit the flow control signal to the one or more upstream network devices.

14. The network device of claim 13 wherein the flow control signal includes an Ethernet PAUSE message.

15. The network device of claim 13 further comprising:
 at least two input interfaces, and
 wherein the link monitoring unit is further configured to:
  monitor traffic flow received at the at least two input interfaces.

16. The network device of claim 15 wherein, when identifying one or more upstream network devices to which to transmit a flow control signal, the flow control unit is configured to:
 identify the one or more upstream network devices based on the monitored traffic flow received at the at least two input interfaces.

17. The network device of claim 13 wherein the network device is an Ethernet-based internetworking device.

18. The network device of claim 13 wherein the network device is one of a Synchronous Optical Network/Synchronous Digital Hierarchy (SONET/SDH) transport device, a SONET/SDH add-drop multiplexing (ADM) device with Ethernet-over-SONET (EoS) interfaces, an Ethernet switching device, a Resilient Packet Ring (RPR) device, or an Internet Protocol/Multiprotocol Label Switching (IP/MPLS) routing/switching device.

19. A method, performed by a network device, for controlling traffic flow in a network, comprising:
 detecting congestion in the network;
 identifying at least one upstream device to which to send a flow control message when congestion in the network is detected, the at least one upstream device being a device that is transmitting above a predetermined level; and
 transmitting the flow control message to the identified upstream device, the flow control message instructing the identified upstream device to slow down transmissions to the network device.

20. The method of claim 19 wherein the network includes an Ethernet-based network.

21. The method of claim 20 wherein the flow control message includes a PAUSE message.

22. The method of claim 19 wherein the detecting includes:
 detecting congestion on an outgoing link of the network device.

23. The method of claim 19 wherein the detecting includes:
 receiving a flow control message from a downstream device.

24. The method of claim 19 further comprising:
 receiving the flow control message at the identified upstream device; and
 performing a flow control action in response to receiving the flow control message.

25. The method of claim 24 wherein the flow control action includes one of propagating the flow control message to at least one other upstream device, pausing data transmissions to the network device, or ignoring the flow control message.

* * * * *